United States Patent Office 2,826,503
Patented Mar. 11, 1958

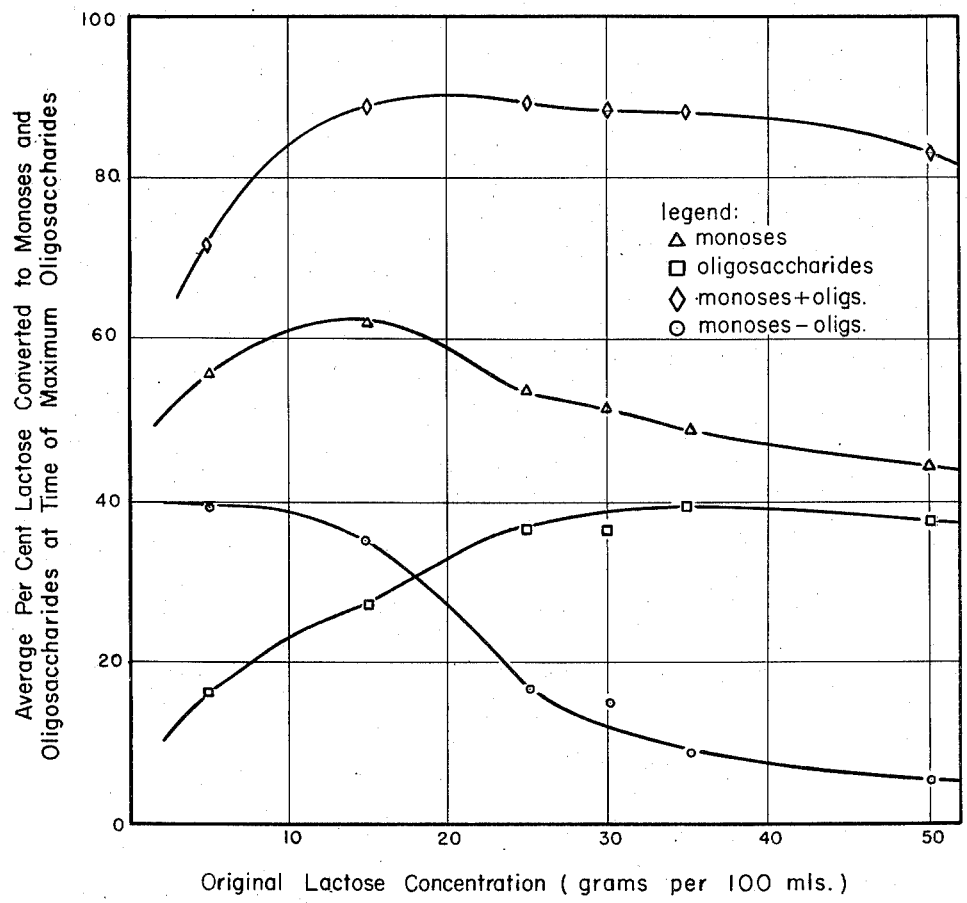

2,826,503

CONVERSION OF LACTOSE TO OLIGOSACCHARIDES

Henry R. Roberts, Oakdale, and Julio D. Pettinati, West Sayville, N. Y., assignors, by mesne assignments, to National Dairy Products Corporation, New York, N. Y., a corporation of Delaware Application May 23, 1955, Serial No. 510,168

14 Claims. (Cl. 99—54)

This invention relates to the enzyme hydrolysis of lactose to oligosaccharides and other lactase hydrolytic sugars, including glucose and galactose, and more particularly to a process of treating milk products with lactase to convert the lactose therein to glucose and galactose with an optimum proportion of oligosaccharides, without changing the total sugar content thereof or the proportion of sugar to the other milk solids. The invention also relates to lactose-containing materials such as milk products in which a major proportion of the lactose has been converted to oligosaccharides and other lactase hydrolytic sugars, including glucose and galactose.

The Stimpson Patent No. 2,681,858, dated June 22, 1954, describes a process for the enzyme hydrolysis of the lactose to glucose and galactose. A lactase enzyme preparation is added to a milk product which either has been concentrated to at least a 20% solids content or has been pasteurized, or both, after which the mixture is held under conditions favoring lactase hydrolysis of lactose to glucose and galactose. Temperatures over the range from 25° to 135° F. may be employed. Hydrolysis reaches its fullest extent in from four to five hours to as much as ten days, depending upon the temperature. The hydrolysis may be halted by inactivating the lactase enzyme at any stage short of completion, or following completion of hydrolysis of substantially all of the lactose. This is most easily done by heating the mixture at an elevated temperature for a short time. Various methods for treatment of the hydrolyzed milk product are described in the patent.

In the course of the lactase hydrolysis of the lactose, glucose and galactose are not the only sugars formed. Further investigations since the filing date of the Stimpson patent have confirmed the presence of additional reducing sugars in the hydrolyzed products. In fact, eleven additional sugars have been detected, and more are known to be present but have not been isolated in a pure enough form for characterization. These substances when subjected to further lactase hydrolysis yield various combinations of glucose and galactose. This information, as well as the position of the substances on chromatograms obtained by filter paper chromatography (Analytical Chemistry 23, 1146 (1951), see the working examples), and their reactions with various reagents, indicate that at least some of these substances are disaccharides other than lactose, and some are even higher molecular weight polysaccharides or derivatives of these. These sugars are referred to collectively hereinafter as "oligosaccharides." The chemical structures of these materials have not been fully elucidated at the present time.

The present invention relates to a process as generally described in the Stimpson Patent No. 2,681,858 wherein the lactase hydrolysis of lactose is closely controlled so as to convert the lactose into an optimum proportion of oligosaccharides, together with a minimum proportion of glucose and galactose. This is accomplished by establishing the concentration of lactose initially in the aqueous reaction medium at a minimum of 15 parts, and desirably 25 parts or more, per 100 parts of reaction medium and by establishing an absolute overall minimum amount of lactose, including both that present from the outset and any that is added later, of at least 25 parts per 200 parts of reaction medium and by limiting the hydrolysis time to a maximum of 12 hours.

In general, it may be stated that the lactose concentration in the aqueous reaction medium at the start of and during the hydrolysis should be as high as possible. Preferably, the reaction medium which is to be hydrolyzed is initially saturated with respect to lactose, and is held at as high a lactose level thereafter as is possible, either by continuous addition of lactose or by having an excess of lactase present initially in the reaction medium, and the hydrolysis is carried out at an elevated temperature and is arrested after about 3 to 8 hours. Further details will be apparent from the later discussion.

The invention is particularly applicable to cow's milk as the source of the lactose. However, the term "milk" as commonly used refers to the normal secretion of the mammary glands of a mammal, and all milks contain an appreciable lactose content. The process of the invention may be employed to hydrolyze the lactose content without reducing the total sugar content of any milk including, in addition to cow's milk, mare's milk, goat's milk, ewe's milk, etc.

The term "milk product" is used generically in the specification and claims to refer not only to whole milk and skim milk, but also to the lactose-containing products derived from any of the above milks, including whey derived from casein or cheese manufacture, the mother liquor wash water obtained as a waste product in the production of lactose from whey or milk products, and lactalbumin mother liquors such as those obtained following the precipitation of lactalbumin. All milk products which contain lactose can be treated by the process of the invention.

The process also is applicable to aqueous lactose solutions. Both milk products and aqueous lactose solutions are referred to by the term "reaction medium" as used in the specification and claims.

The reaction medium whose lactose content is to be hydrolyzed should have an initial solids content sufficient to bring the lactose concentration to 15%, i. e., 15 parts per 100 parts of reaction medium, and preferably to from 25% to 50% by weight. At lower lactose concentrations the hydrolysis will result in very low yields of oligosaccharides. If the reaction medium initially has too low a solids content, such as is true of nearly all milk products, it may be concentrated by any well known method which does not change the character or flavor of the milk, such as concentration in vacuo at a temperature in the range from 90° F. to 135° F. If less than 25% lactose is present initially, lactose in the form of the solid or an aqueous solution must be added to the reaction medium during the hydrolysis, and the amount added should be enough to bring the amount of lactose at least to 25 parts per 200 parts of reaction medium.

Quantitative production studies have shown that the higher the lactose concentration in the reaction medium initially and throughout the process, the greater the amount of oligosaccharide formation. Hence, it may be said, generally, that it is desirable to maintain the lactose concentration at the highest possible value throughout the hydrolysis. A 15% lactose concentration appears to be the minimum starting concentration, below which oligosaccharide formation is not high enough to be of sufficient interest, but even this is insufficient to obtain a good yield, and requires supplementing by adding more lactose in the form of a solution of at least 10 parts lactose in 100 parts or less of aqueous solution later on during the hydrolysis to meet the absolute overall minimum of 25 parts of lactose per 200 parts of reaction medium.

The upper limiting concentration is fixed by the solubility of lactose in the hydrolysis solution at the temperature chosen for the hydrolysis, but this is not the limit of lactose than can be added. For example, lactose is soluble to the extent of only 22% at 35° C., a preferred hydrolysis temperature. However, it is possible to add more lactose initially than is soluble at the hydrolysis temperature, and the undissolved lactose will go into solution as the hydrolysis proceeds. Thus the 25% minimum and more can be added initially. However, the initially undissolved lactose is not dissolved at the rate at which it is consumed in solution by the enzyme, and therefore there is a limit here to the amount of excess lactose which can be added beyond that which is initially soluble in the solution at the hydrolysis temperature. The limiting initial and overall lactose concentration appears to be 50% lactose, and even this is not critical, but no improvement in yield is obtained when more is used.

As an alternative to adding all of the lactose at the start of the reaction, whether it dissolves or not, it is possible to add lactose continuously to the solution as the hydrolysis proceeds. This addition of course is essential when less than 25% lactose is present initially. It is preferred to add the lactose in solution form, preferably as a saturated solution, because solid lactose dissolves so slowly.

Another factor which must be kept in mind is that lactose is decreasingly soluble as the glucose and galactose concentration increases. Tally and Hunter (J. Am. Chem. Soc. 74, 2789 (1952)) showed that at 25° C. the maximum concentration falls to 4.5% lactose in the presence of 39.6% glucose and 14.8% galactose. Thus, in any hydrolysis where the original lactose is not all dissolved, it goes into solution thereafter as goverened by the concentration of monoses, so that in effect its solubility rate decreases as the hydrolysis progresses. At low lactose concentrations, the hydrolysis tends to favor the production of monoses rather than oligosaccharides, and thus the longer the hydrolysis proceeds, the lesser the likelihood of obtaining a good yield of oligosaccharides. Under these conditions, it is indeed surprising that it is possible to increase the oligosaccharides concentration to as high a level as has been achieved in the process of the invention.

Another alternative procedure is to form, initially a supersaturated solution of lactose. Lactose crystallizes very slowly from supersaturated solutions, especially without seeding. Thus, the lactose can be dissolved to form a saturated solution at a temperature considerably higher than the hydrolysis temperature, and this saturated solution is then cooled to the hydrolysis temperature, whereupon it becomes supersaturated. By the action of the lactase enzyme, the excess lactose in solution is consumed before it can crystallize. By use of supersaturated solutions the maximum oligosaccharides concentration is obtained in less time, as compared to the use of a merely saturated solution, but the total yield of oligasaccharides obtained by this method does not always exceed that yielded by a hydrolysis in which lactose goes into solution as fast as it is utilized.

Figure 1 is a graph showing the relationship of the original lactose concentration to the average percent lactose converted to monoses and oligosaccharides at the time of maximum oligosaccharides formation. The graph shows clearly that the yield of oligosaccharides increases rapidly and enters the optimum range at the 25% original lactose concentration level, continues to rise, reaching the maximum at the 35% level, and remains constant at the maximum approximately to the 50% level. The percentage of monoses begins to decrease at the 15% level, is low at the 25% level and continues to decrease to the 50% level of original lactose concentration. Throughout this range, the percent lactose converted to oligosaccharides remains at approximately 40%, and the total percent lactose hydrolyzed is from 85 to 90%.

The graph shows that the lower substrate levels (approximately 5 to 25% range) distinctly favor the formation of monoses rather than oligosaccharides. This 5 to 25% range is inclusive of the lactose concentrations in the milk products disclosed as starting materials in the process of the Stimpson Patent No. 2,681,858. This patent does not disclose milk product starting materials having lactose concentrations of 25% and higher, nor does it disclose adding more lactose as the reaction proceeds.

It must be remembered that 22% lactose is the saturation point of an aqueous solution at 35° C., and that milk products, before concentration, contain at most about 4 to 6% lactose, and would not be concentrated to a point at which lactose crystallizes, or to form a super-saturated lactose solution. The present invention, in contrast, requires extraordinary lactose concentrations not formally found in milk products.

It has been found that when a milk product is used as the base for the reaction medium, an improvement in the hydrolysis may be obtained if the milk product is pasteurized prior to inoculation with the lactase enzyme. Flash pasteurization will give a noticeably improved yield. In flash pasterurization processes, the milk product is usually heated to a temperature of from 160° to 185° F. for from 10 to 30 seconds. However, the greatest improvement is obtained if the milk product is subjected to flash pasteurization at 180° F. for 10 to 30 seconds, or to pasteurization by a holding process, i. e., subjected to a temperature of from 140° to 160° F. for 30 minutes or longer. It is thought that the phenomenon can be explanied on the assumption that unpasteurized milk products contain some material which represses enzyme activity. Flash pasteurization at normal temperatures evidently is partially effective in destroying or inactivating this material, while pasteurization by a holding method is considerably more effective.

For best results, the milk is both pasteurized and concentrated and this procedure is preferred. The pasteurization of the milk product may be accomplished either before or after concentration.

The pH of the lactose-containing reaction medium is brought to within the range from 6 to 7, and a lactase enzyme preparation is added. The lactose-containing reaction medium is then held under conditions favoring lactase hydrolysis of lactose. Temperatures over a wide range, from 40° to 135° F., may be employed. At temperatures below 40° F. lactase activity is so slow as to be almost negligible. Holding at temperatures above 135° F. will inactivate the enzyme. The production of oligosaccharides reaches its maximum in from 3 to 12 hours at temperatures of from 95° to 130° F. and at these temperatures the bacterial content of the milk is held at a minimum or decreases, and therefore temperatures within this range are preferred.

The amount of enzyme added will depend upon the potency of the lactase preparation and the amount of lactose, as well as the proportion of lactose that must be hydrolyzed. A relatively small amount of enzyme is used in proportion to the lactose. In general, from 1 to 3.5% enzyme by weight of the lactose present in the reaction medium is employed at the start. To achieve substantially complete, i. e., over 85% hydrolysis of the lactose and obtain the optimum yield of oligosaccharides, the amount of enzyme present should not be permitted to fall below 1% until after hydrolysis is over 80% complete.

The oligosaccharides concentration reaches a maximum at a very early stage in the hydrolysis and in many cases before a major proportion of the lactose has been converted to lactase hydrolytic sugars. Accordingly, it is an important aspect of the present invention that the lactase enzyme be inactivated and the hydrolysis arrested after maximum yield of oligosaccharides has been obtained. Although more lactose may be hydrolyzed after this point has been reached, the amount of oligosaccharides nonetheless steadily diminishes and the amount of monoses increases rapidly. At a 35% starting lactose solution with the addition of 35% lactose, the optimum oligosaccharides concentration was obtained after 6 hours and remained constant for from 6 to 12 hours, so that nothing was gained by continuing the hydrolysis beyond 6 hours. In most instances it will be found that a hydrolysis time of from 3 to 8 hours is optimum, after which no benefit will be obtained. The maximum hydrolysis time will be approximately 12 hours, after which the oligosaccharides concentration almost invariably will be reduced.

The progress of the hydrolysis can readily be observed by following the decreasing lactose concentration during the hydrolysis. In every instance observed to date, the maximum formation of oligosaccharides is obtained when about 85% to 90% of the lactose has been converted to lactase hydrolytic sugars.

The hydrolysis may be halted when the optimum yield of oligosaccharides has been reached by treating the mixture to inactivate the lactase enzyme. Pasteurization by a holding method, as for example heating the mixture at 160° F. for 30 minutes, is effective for this purpose, but drying the mixture by spray-drying, roller-drying or tray-drying at a sufficiently elevated temperature, say above about 145° F. up to about 175° F., will also inactivate the enzyme. If the mixture is frozen and stored at 0° F. or below, enzyme activity is arrested but will resume when the mixture is reheated to room temperature or above.

Lactose-containing products prepared in accordance with the above procedure usually contain 10 to 15% or less of the lactose originally present, the lactase-hydrolytic sugars derived from the lactose consisting of 35 to 40% oligosaccharides, and approximately 50 to 55% glucose and galactose together.

Any lactase enzyme preparation known to the art can be employed in the process of the invention. It is essential, however, if the lactase is derived from bacteria, yeasts or molds, that the lactase be uncontaminated with those enzyme systems which affect carbohydrates, e. g., which convert glucose, galactose and oligosaccharides to carbon dioxide and alcohol. This type of enzyme system is termed "zymase" by the art and it will be understood that lactase preparations derived from yeast and employed in the process of the invention must be zymase-inactive in order to prevent conversion of glucose, galactose and oligosaccharides arising from hydrolysis to carbon dioxide and alcohol. If the zymase contained in the yeast is inactive, it is not necessary to separate the lactase from the yeast.

Among the yeasts which may be employed as the source of lactase enzyme are NRRL Y 665 *Saccharomyces fragilis*, NRRL YL 28 *Torulopsis spherica*, NRRL YL *Zygosaccharomyces lactis* and strains of *Torulopsis utilis* or *Candida pseudotropicalis* adapted to the utilization of lactose for growth and fermentation. A lactase enzyme obtained from suitable bacteria, such as *Lactobacillus bulgaricus* and *Escherichia coli* or from a suitable mold such as *Aspergillus oryzae*, may also be used.

The zymase may be destroyed without destroying the lactase by drying the yeast under carefully controlled conditions, or by plasmolyzing the yeast in an organic solvent, such as toluene, chloroform or ethyl ether, or by heating the yeast at 123° F. in a medium whose pH is about 7.

The following examples illustrate preferred embodiments of the process of the invention.

The oligosaccharide formation in the examples was determined by detecting their presence and measuring the amount formed utilizing the paper chromatographic method developed by McFarren, Brand and Rutkowski (Analytical Chemistry 23, 1146 (1951)). This procedure incorporates silver nitrate directly into the solvent phase used for developing the chromatogram. The sensitivity of the Tollen's reaction under these conditions is greater than when spraying the paper strips directly with ammoniacal silver nitrate. This permitted the observation of substances which under other conditions would not have given a detectable color. The amount of the oligosaccharides formed was calculated by subtracting the sum of the lactose, galactose and glucose content determined by chromatographic methods from the amount of lactose prior to hydrolysis. However, a careful visual examination of the spots produced on a chromatogram by the oligosaccharides results in an estimated figure which closely approximates the figure arrived at by the difference method. A refinement of this visual estimation technique has been used by De Whalley, Albon and Gross (Analyst 76, 287 (1951)), in the analysis of raffinose in sucrose samples. Under the chromatographic conditions specified by McFarren et al. the higher molecular weight oligosaccharides are less reducing than lactose, which in turn is less reducing than galactose, and galactose is less reducing than glucose.

EXAMPLES 1 TO 3

The lactase used was obtained from *Saccharomyces fragilis*. The enzyme was prepared by culturing a heat-treated filtered acid whey with *Saccharomyces fragilis* within the pH range 4.3 to 4.8 with moderate air injection. When the lactose was exhausted the culture was centrifuged and the resulting yeast paste was freeze-dried in order to remove the water and inactivate the zymase. The dried yeast was used without further treatment as a source of lactase enzyme. The activity of this yeast lactase was such that a 1:40 ratio of yeast lactase to lactose hydrolyzed 80% of a concentrated skim milk containing 15% lactose after four hours at 50.5° C. The hydrolysis was determined by measuring the amount of monoses formed using the Tauber-Kleiner method (Journal of Biological Chemistry, 99, 249 (1932)) and incorporating Cajori's modification for lactose-containing materials (Journal of Biological Chemistry, 109, 159 (1935)).

In each of these examples the amount indicated of C. P. lactose was weighed out, and enough 0.067 molar pH 6.2 phosphate buffer (8 parts of 0.067 molar potassium monohydrogen phosphate and 2 parts of 0.067 molar sodium dihydrogen phosphate) was added to the lactose to make about 80 ml. of slurry. This slurry was warmed to 95° F. while 500 mg. (583 mg. in Example 3) of the raw lactase yeast were weighed out and ground to a paste with a few milliliters of the buffer solution using a glass rod. This paste was then washed into the lactose slurry and the final volume was fixed at 100 ml. by adding the 0.067 molar pH 6.2 phosphate buffer. The lactase enzyme concentration then was 0.5% (0.58% in Example 3) by volume of the solution. The reaction then proceeded at 95° F., with a thorough mixing of the reaction mixture every 20 minutes. Samples were taken every hour, pasteurized for 30 minutes at 160° F., deproteinized and diluted to a volume which could be satisfactorily spotted on filter paper chromatograms in accordance with the method described. The data at time of maximum conversion is recorded in the table below.

Table I

| Example No. | Original Lactose, g./100 ml. | Percent Maximum Conversion (based on original lactose) | Time to Reach Maximum (hours) |
|---|---|---|---|
| 1 | 25 | 34.3 | 8 |
| 2 | 30 | 40.6 | 5 |
| 3 | 35 | 44.5 | 5 |

It is apparent from the results obtained that from 35% to 40% of the lactose can be converted to oligosaccharides under these conditions.

EXAMPLE 4

A lactose solution was prepared containing 15 g. lactose in 100 ml. of solution. 0.5% by volume of the lactose solution (3.3% by weight of the lactose) of the lactase enzyme preparation of Examples 1 to 3 added and the mixture held at 95° F. As the hydrolysis proceeded, 100 ml. of a 15% lactose solution in a pH 6.2 phosphate buffer, 0.067 molar, was added continuously over a 6.5 hour period, so that overall, 30 g. of lactose in 200 ml. of solution was hydrolyzed. At the end of 10.5 hours the hydrolysis was arrested by heating the reaction mixture for 30 minutes at 71° C. (160° F.). Chromatographic analysis showed a 34.1% conversion of lactose to oligosaccharides. This is a 9.5% increase in oligosaccharides concentration, compared to a regular batch type hydrolysis of a lactose solution containing 30 g. lactose in 200 ml.

EXAMPLE 5

A purified lactase enzyme preparation was prepared as follows:

The dried *Saccharomyces fragilis* yeast was suspended in water in an agitator such as a rotary drum. A small amount of toluol was added as a preservative. A mixture of potassium hydrogen phosphate and potassium dihydrogen phosphate was used in the mixture to adjust the pH thereof to about 7.1. The extraction was carried out at about 25° C. and was complete in approximately 18 hours. A 10% slurry of the yeast in the phosphate buffer gave a desirable extraction.

After the extraction was complete, the yeast slurry was centrifuged to remove the yeast cells and other debris and to obtain a centrifugate containing the lactase enzyme. (If necessary, the centrifugations may be repeated to obtain a clarified centrifugate.)

The centrifugate was cooled to a temperature of approximately 40° F. in a chilled tank and acetone at 40° F. added thereto until the acetone concentration was about 50% of the total volume in order to precipitate the lactase containing material. The precipitation of lactase was complete within approximately 2 hours. The lactase was then separated by centrifugation.

The precipitate containing the lactase was then dissolved in water in a suitable tank to provide a suspension having a total solids content of about 8% and centrifuged. To the centrifugate there was added a sucrose carrier to bring the final solids content thereof to about 15%. The lactase-sucrose mixture was then spray dried at an air inlet temperature of 260° F. and an air outlet temperature of 180° F. to yield a dry lactase preparation.

This purified enzyme possessed three times the activity per milligram weight of the crude lactase yeast employed in Examples 1 to 4. Using this purified lactase preparation to hydrolyze lactose solutions under the conditions set forth in Examples 1 and 2 and, in the same proportions, the following results were obtained:

| Original Lactose Conc. | Percent Conversion of Lactose to Oligosaccharides Using | |
|---|---|---|
| | Crude Lactase | Purified Lactase |
| 25% | 34.4 | 41.1 |
| 30% | 40.6 | 42.6 |

This shows the importance to yield of a pure enzyme.

Samples of the product obtained in accordance with the above procedure were chromatographed by the method described above. Eleven different oligosaccharides were isolated by this procedure. The results of the acid hydrolysis of the individually separated oligosaccharides reveals that they are composed of galactose and glucose molecules as follows:

HYDROLYSIS

Substance No. 1 _____ Galactose and glucose.
Substance No. 2 _____ Galactose and glucose.
Substance No. 3 _____ Galactose and glucose.
Substance No. 4 _____ Galactose.
Substance No. 5 _____ Galactose and glucose.
Substance No. 9 _____ Galactose.
Substance No. 10 _____ Galactose.

Substances Nos. 6, 7 and 8 have not been isolated in sufficient purity to be identified individually but it is known that they are also composed of galactose and/or glucose molecules.

EXAMPLE 6

In this experiment 100 ml. of a 35% solution of lactose in a pH 6.2, 0.67 molar aqueous phosphate buffer (as in Examples 1 to 3) was added continuously dropwise to an equal volume of 35% aqueous lactose solution mixed in the same buffer and containing 0.58% lactase yeast. The hydrolysis temperature was 95° F. The results are shown in Table II.

Table II

CHROMATOGRAPHIC ANALYSIS OF LACTASE HYDROLYZED 35% +35% (G./100 ML.) LACTOSE

| Time, Hours | Oligosaccharides, g./100 mls. | Galactose, g./100 mls. | Glucose, g./100 mls. | Lactose, g./100 mls. |
|---|---|---|---|---|
| 5 | 14.9 | 4.5 | 7.5 | 8.1 |
| 6 | 15.0 | 4.7 | 9.4 | 5.9 |
| 7 | 14.1 | 5.4 | 9.9 | 5.6 |
| 8 | 15.1 | 5.7 | 10.5 | 3.7 |
| 10 | 15.4 | 6.7 | 10.4 | 2.5 |
| 12 | 15.3 | 6.9 | 11.0 | 1.8 |

These results show that oligosaccharides production in an addition type of hydrolysis approaches its maximum within 5 hours of the start of hydrolysis. After an additional 5 hours, the yield is increased only by 2%. On the other hand, the glucose and galactose concentrations continue to increase appreciably as the hydrolysis proceeds. This suggests that in this type of hydrolysis a 5-hour hydrolysis time is adequate for all practical purposes.

EXAMPLES 7 to 16

Table III which follows gives supplemental data for a number of experimental runs. In each case the lactose substrate at the concentration indicated in the table was mixed in a pH 6.2, 0.067 molar phosphate buffer prepared as set forth in Examples 1 to 3 and each was hydrolyzed with 0.25% or 0.5% or 1.0% concentration of lactase yeast, as indicated in the table. The hydrolyzing temperature in all cases was 95° F. Unless otherwise indicated, all of the lactose was present initially to form a saturated solution with the excess lactose undissolved,

Table III

CHROMATOGRAPHIC ANALYSIS OF LACTASE-HYDROLYZED LACTOSE AT TIME OF MAXIMUM OLIGOSACCHARIDES

| Ex. No. | Original Lactose, g./100 ml. | Lactase Yeast, g./100 ml. | Time, Hrs. | Original Lactose Converted | g./100 ml. at Maximum | | | | Percent Orig. Lactose |
|---|---|---|---|---|---|---|---|---|---|
| | | | | | Oligosaccharides | Galactose | Glucose | Lactose | |
| 7 | 25 | 0.5 | 8 | 36.8 | 9.2 | 5.6 | 7.2 | 3.0 | 11.8 |
| 8 [1] | 25 | 0.5 | 8 | 41.2 | 10.3 | 5.8 | 7.8 | 1.1 | 4.3 |
| 9 [2] | 25+25 | [6] 0.5 [7] 0.25 | 8 | 46.0 | 11.5 | 4.9 | 6.9 | 1.6 | 6.4 |
| 10 | 30 | 0.5 | 5 | 40.7 | 12.2 | 5.6 | 9.6 | 2.6 | 8.7 |
| 11 [3] | 30 | 0.5 | 6 | 38.3 | 11.5 | 5.0 | 9.3 | 4.2 | 14.0 |
| 12 | 35 | 0.58 | 5 | 44.6 | 15.6 | 6.8 | 10.3 | 2.3 | 6.4 |
| 13 [4] | 35+35 | [6] 0.58 [7] 0.29 | 10 | 44.0 | 15.4 | 6.7 | 10.4 | 2.5 | 7.1 |
| 14 | 40 | 0.5 | 5 | 40.8 | 16.3 | 7.0 | 10.8 | 6.0 | 15.0 |
| 15 | 50 | 0.5 | 6 | 42.4 | 21.2 | 7.6 | 12.6 | 8.6 | 17.2 |
| 16 [5] | 50 | 1.0 | 4 | 36.6 | 18.3 | 9.6 | 15.5 | 6.6 | 13.2 |

[1] Hydrolyzed with purified enzyme of Example 5.
[2] Addition type.
[3] Hydrolyzed at room temperature, supersaturated solution, dissolved initially.
[4] Addition type.
[5] Supersaturated solution, all lactose dissolved initially.
[6] Starting concentration.
[7] Concentration at end of conversion.

The results show that good conversions are obtained at 25 to 50% lactose concentrations, using addition type operations and operations in which all of the lactose is present from the start, either dissolved (separately) or undissolved. The addition type of operation gives a slightly better yield than that in which all of the lactose is added initially (Example 9 vs. Examples 7, 8 and 12).

EXAMPLE 17

Exactly 50 g. of Cheddar cheese whey powder (71% lactose by weight) was weighed out and mixed with 50 ml. of water to make a reconstituted whey with a consistency close to that of a paste, and having a lactose concentration of 35.5%. This semi-paste was warmed to 95° F. while 500 mg. of raw lactase yeast was weighed out and ground to a paste with a few drops of water using a glass rod. The yeast paste was then mixed into the whey mixture without any further addition of water. The reaction proceeded at 95° F. in a water bath at that temperature while slow mechanical agitation was applied to the whey semi-paste. A sample was taken every hour, deproteinized immediately (to destroy lactase action) and the deproteinized filtrate diluted to a volume satisfactory for spotting on chromatograms. The last two samples taken, at 6 and 7 hours, of this 35.5 weight percent lactose hydrolyzed with 0.5 weight percent yeast were analyzed quantitatively. The results were:

| Time, Hours | Original Lactose Converted, Percent | g./100 of Reaction Mixture | | | | Residual Lactose, Percent Original |
|---|---|---|---|---|---|---|
| | | Oligosaccharides | Galactose | Glucose | Lactose | |
| 6 | 42.6 | 15.1 | 5.4 | 8.5 | 6.5 | 18.3 |
| 7 | 43.6 | 15.5 | 5.2 | 9.1 | 5.7 | 16.1 |

Lactase-hydrolyzed lactose milk products have many uses, as disclosed in the Stimson Patent No. 2,681,858, and the products of this invention can be used for the same purposes. They show a lesser tendency towards lactose crystallization than do the untreated materials. Thus, they can be used in the manufacture of ice cream which will not develop sandiness. There is some evidence that the presence of the oligosaccharides may inhibit lactose crystallization, as well as the prevention of frozen age thickening in frozen lactase hydrolyzed concentrated milk, and thus the products of the invention are superior to the Stimpson products in this respect because they contain more oligosaccharides.

The oligosaccharides may also have some nutritional significance. Animal and poultry feeds based on lactase-hydrolyzed lactose have been shown to be superior to those based on normal lactose, and the products of the invention have been found to be excellent in this case. This may be explainable by the fact that the oligosaccharides contain galactose molecules, and this may lead to a better utilization of these substances by the body as reserve sources of galactose. Galactose is found in combination in many organs in the body. Cerebrosides are glycolipids, characterized by containing one molecule of sphingosine, one molecule of a $C_{24}$ fatty acid and one molecule of D-galactose. Cerebrosides have been associated primarily with the brain and nervous tissues. However, they have also been reported to occur in the spleen, kidneys, liver, blood corpuscles, lungs, adrenals, and the retina of the eye. Three cerebrosides which are generally recognized are phrenosin, kerasin, and nervon. All have the same fundamental structure, the only difference being in the nature of the fatty acid residue.

Galactose is also a component of blood polysaccharides. Certain polysaccharides which have been isolated from the blood and urine are related to the blood types of the animals from which they are obtained. The specific polysaccharides obtained from individuals belonging to groups II (A) and III (B) are active haptenes and combine with the alpha and beta agglutinins of human blood. The blood group A, B and O substances are higher complex molecules of which about ¾ is polysaccharide and ¼ is amino acid in nature. The monosaccharides formed after acid hydrolysis include N-acetylglucosamine, glucosamine, mannose and galactose.

These oligosaccharides have several industrial uses, such as stabilizers for ice cream and chocolate milk drinks, fillings for soft center chocolates, adhesives and starting materials for lacquers, films and coatings. The oligosaccharides also serves as an additive to dried whole milk for possible prevention of the development of oxidized flavor, and as an anti-staling agent for bread. In these instances, they can be added as skim milk, fluid or powdered, hydrolyzed in accordance with the invention, see Nature 175, 4458 (1955).

All percentages in the specification and claims are by weight.

We claim:

1. In the process of hydrolyzing lactose to lactase hydrolytic sugars, including oligosaccharides, glucose and galactose the improvement to favor synthesis of oligosaccharides and minimize hydrolysis of oligosaccharides in the process, in order to obtain an optimum yield of oligosaccharides, which comprises adding an enzyme preparation in which the enzyme consists essentially of lactase enzyme to an aqueous fluid medium comprising at least 15 parts lactose per 100 parts of solution and, if the fluid medium initially contains less than 25 parts lactose per 100 parts of solution, adding sufficient additional lactose to the fluid medium to bring the total lactose present and added during the hydrolysis to at least 25 parts per 200 parts of solution, holding the product at a temperature within the range from 40 to 135° F. favoring lactase hydrolysis of lactose to lactase hydrolytic sugars and synthesis of oligosaccharides for not in excess of twelve hours until there is obtained a product containing such hydrolytic sugars and an optimum yield of oligosaccharides, and then arresting the hydrolysis before the lactase enzyme has hydrolyzed a substantial proportion of the oligosaccharides thus formed to monosaccharides.

2. A process in accordance with claim 1 in which the aqueous fluid medium is a milk product.

3. A process in accordance with claim 2 in which the milk product is skim milk.

4. A process in accordance with claim 2 in which the milk product is whey.

5. A process in accordance with claim 2 which includes concentrating the milk product to a solids content of at least 20%, and obtaining a lactose concentration within the 15 parts initial minimum and 25 parts overall minimum as stated.

6. A process in accordance with claim 2 which includes pasteurizing the milk product prior to adding the enzyme preparation.

7. A process in accordance with claim 2 in which at least 25% lactose is present initially in the aqueous fluid medium.

8. A process in accordance with claim 2 in which the aqueous fluid medium is saturated with respect to lactose.

9. A process in accordance with claim 2 in which the aqueous fluid medium is supersaturated with respect to lactose.

10. In the process of hydrolyzing lactose to lactase hydrolytic sugars including glucose, galactose and oligosaccharides the improvement to favor synthesis of oligosaccharides and minimize hydrolysis of oligosaccharides in the process in order to form an optimum yield of oligosaccharides, which comprises forming an aqueous solution of lactose having a lactose content of at least 15 parts lactose per 100 parts of solution and, if the fluid medium initially contains less than 25 parts lactose per 100 parts of solution, adding sufficient additional lactose to the fluid medium to bring the total lactose present and added during the hydrolysis to at least 25 parts per 200 parts of solution, holding the product at a temperature within the range from 40 to 135° F. favoring lactase hydrolysis of lactose to lactase hydrolytic sugars and synthesis of oligosaccharides for not in excess of twelve hours until there is obtained a product containing such hydrolytic sugars and an optimum yield of oligosaccharides, and then arresting the hydrolysis before the lactase enzyme has hydrolyzed a substantial proportion of the oligosaccharides thus formed to monosaccharides.

11. A process in accordance with claim 10 which includes forming a lactose solution initially saturated with respect to lactose at the hydrolysis temperature.

12. A process in accordance with claim 10 which includes forming an aqueous solution initially supersaturated with respect to lactose by dissolving the lactose in water at an elevated temperature above the lactase hydrolysis temperature and then cooling the solution to the lactase hydrolysis temperature.

13. A process in accordance with claim 10 which includes forming a solution initially saturated with respect to lactose and containing excess undissolved lactose.

14. A process in accordance with claim 13 in which the excess undissolved lactose is sufficient to bring the total lactose concentration to within the range from about 35% to approximately 50% by weight.

References Cited in the file of this patent

UNITED STATES PATENTS 2,681,858    Stimpson _____ June 22, 1954

OTHER REFERENCES

Euler: General Chemistry of the Enzymes, 1st ed., John Wiley & Sons, New York, 1912, pp. 168–169.

Whistler et al.: Polysaccharide Chemistry, Academic Press Inc., New York, 1953, pp. 56–57.

U. S. DEPARTMENT OF COMMERCE
PATENT OFFICE

CERTIFICATE OF CORRECTION

Patent No. 2,826,503            March 11, 1958

Henry R. Roberts et al.

It is hereby certified that error appears in the printed specification of the above numbered patent requiring correction and that the said Letters Patent should read as corrected below.

Column 4, line 35, for "formally" read -- normally --; column 6, line 53, for "The" read -- This --; column 10, line 27, for "those" read -- these --.

Signed and sealed this 22nd day of April 1958.

(SEAL)
Attest:

KARL H. AXLINE
Attesting Officer

ROBERT C. WATSON
Commissioner of Patents